United States Patent [19]
Ciccarelli et al.

[11] Patent Number: 5,874,993
[45] Date of Patent: *Feb. 23, 1999

[54] SOLID STATE IMAGE SENSOR WITH SELECTABLE RESOLUTION

[75] Inventors: Antonio S. Ciccarelli; Herbert J. Erhardt; Martin Potucek, all of Rochester, N.Y.

[73] Assignee: Eastman Kodak Company, Rochester, N.Y.

[ * ] Notice: The terminal 6 months of this patent has been disclaimed.

[21] Appl. No.: 426,513

[22] Filed: Apr. 21, 1995

[51] Int. Cl.$^6$ .............................. H04N 3/14; H04N 5/335
[52] U.S. Cl. ........................ 348/294; 348/299; 348/314; 348/316
[58] Field of Search ..................... 348/314, 311, 348/294, 299, 316, 224; 358/213.11; 357/24; 257/230; H04N 3/14, 5/335

[56] References Cited

U.S. PATENT DOCUMENTS

| | | |
|---|---|---|
| 4,740,828 | 4/1988 | Kinoshita . |
| 4,809,083 | 2/1989 | Nagano et al. . |
| 4,858,020 | 8/1989 | Homma . |
| 4,918,506 | 4/1990 | Dyck . |
| 4,942,473 | 7/1990 | Zeevi et al. . |
| 4,996,600 | 2/1991 | Nishida et al. . |
| 5,196,939 | 3/1993 | Elabd et al. . |
| 5,262,871 | 11/1993 | Wilder et al. . |
| 5,264,939 | 11/1993 | Chang ................................ 358/213.22 |
| 5,272,535 | 12/1993 | Elabd . |
| 5,293,432 | 3/1994 | Gonser et al. . |
| 5,326,997 | 7/1994 | Nakanishi ................................ 257/230 |
| 5,489,945 | 2/1996 | Kannegundla et al. ................ 348/521 |

*Primary Examiner*—Andrew I. Faile
*Assistant Examiner*—Vivek Srivastava
*Attorney, Agent, or Firm*—James D. Leimbach

[57] ABSTRACT

A solid state image sensor architecture that utilizes drain structures at one or more locations on a shift register, as set by the design, allowing the user to select which charge packets are needed to represent the image and draining the remaining packets. Since the used packets are drained, there is no need to provide clock cycles to output charge packets that are not used while in the low resolution mode. Clocking can be stopped after the needed number of cycles without leaving charge packets in the shift register without the possibility of corrupting subsequent image information by charge packets that have not been removed. Additionally, the reduction in clock cycles decreases the time required to process the current information, and allows the system to operate at higher speeds.

12 Claims, 6 Drawing Sheets

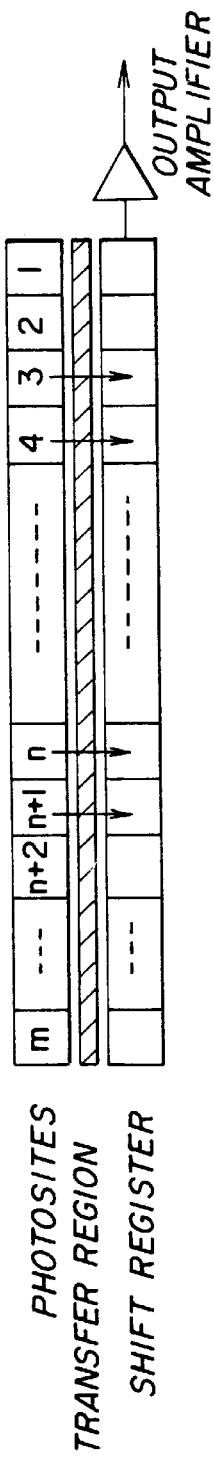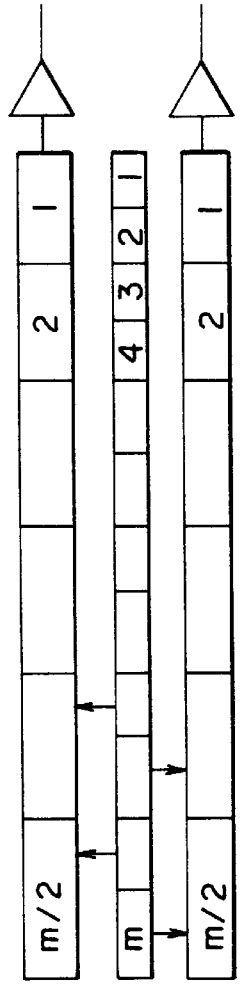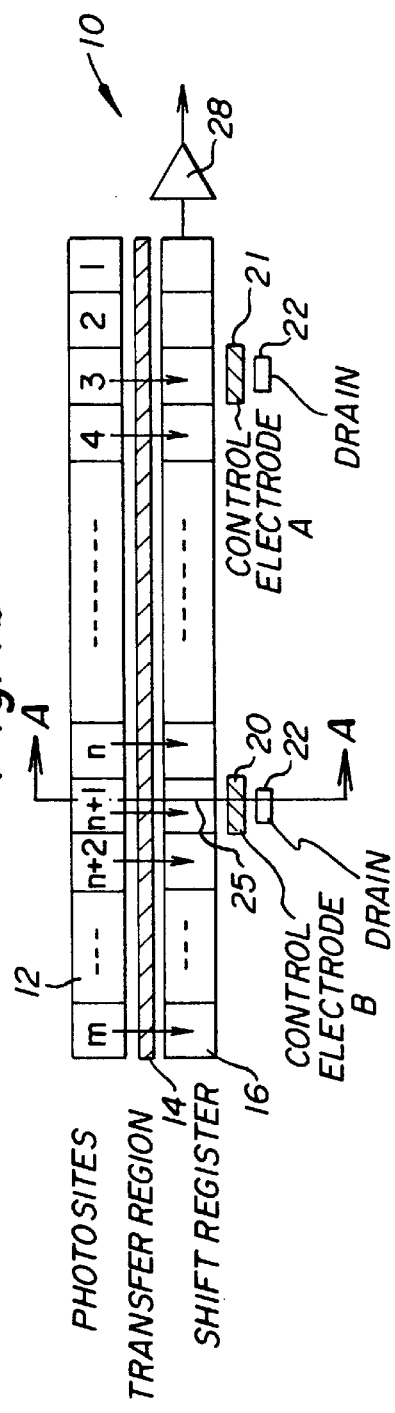

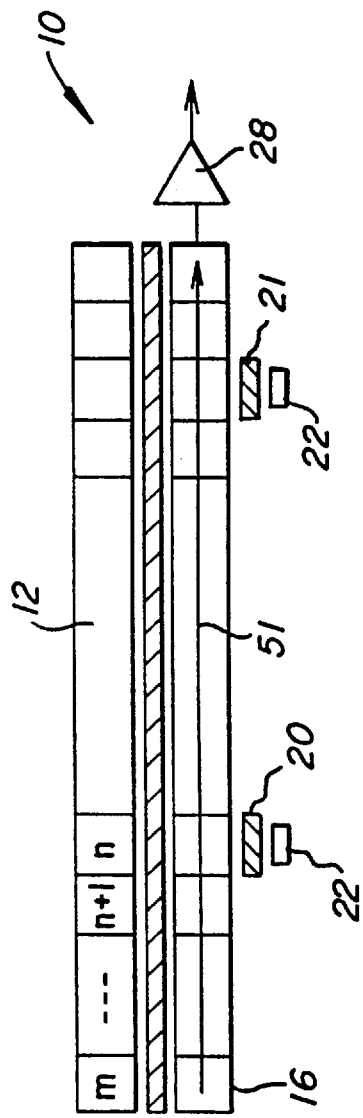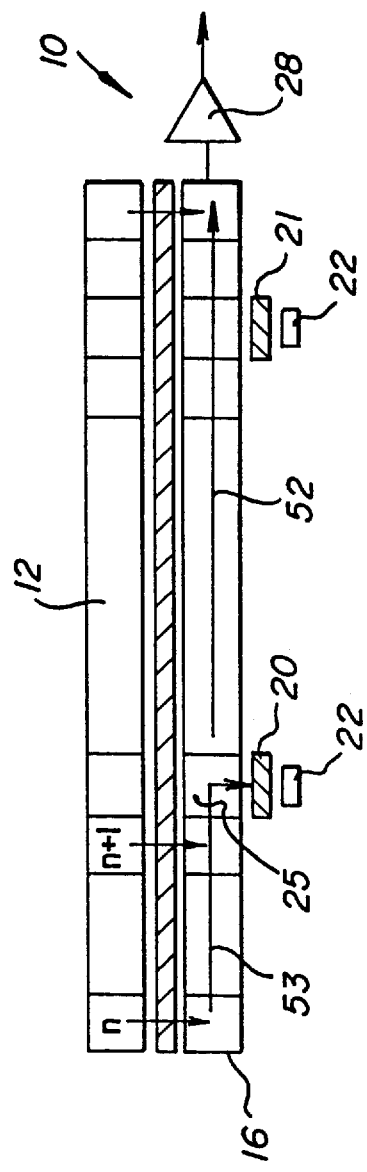

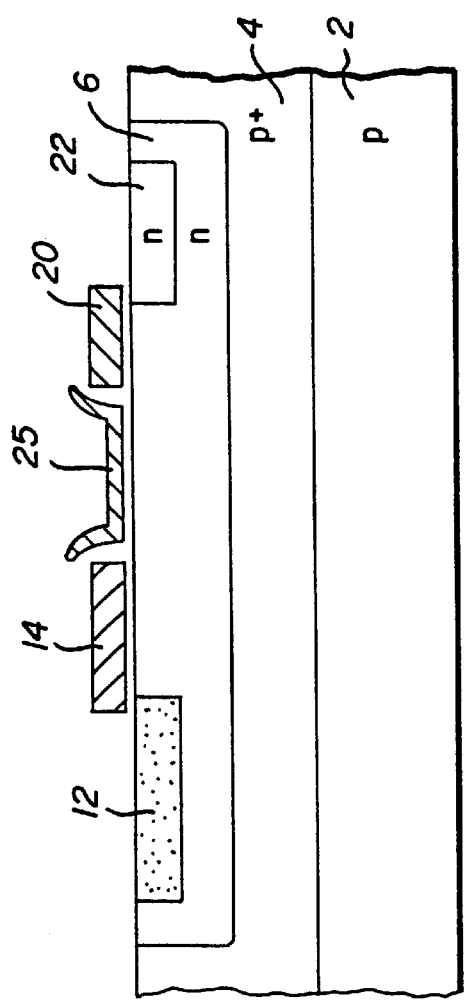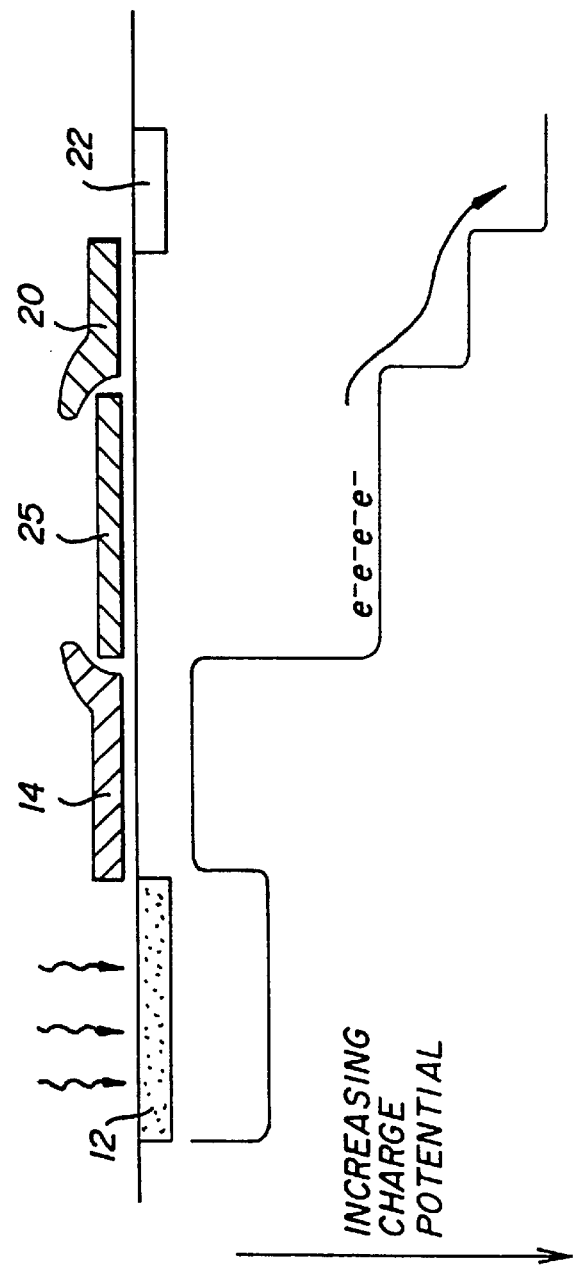

SOLID STATE IMAGE SENSOR WITH SELECTABLE RESOLUTION

BACKGROUND OF THE INVENTION

1. Field of Invention

The present invention relates to image sensors, and more particularly, to image sensors that allow varying degrees of resolution.

2. Description of the Prior Art

Conventional Charge Coupled Device (CCD) image sensors are comprised of an image sensing array and a transfer readout region. Typically these devices may have a shift register which comprises the readout region for each array of photodetectors. In the case of linear image sensors, there is typically one or two shift registers for a linear array of photodetectors, and typically one CCD "cell" for each photo detector. Each CCD cell may contain several electrodes to perform the shifting function.

CCD image sensors operate in the manner described below. Incident light photons penetrate into silicon based photodetectors resulting in the generation of electron-hole pairs. The electrons that are generated, at a rate proportional to the local light intensity, are collected either at the photo site or in an adjacent storage region. The electrons are then transferred through a transfer region into a CCD shift register in a parallel fashion (all charge packets are simultaneously transferred to their respective shift register "cell", thereby maintaining spatial integrity of the information). The individual charge packets are then shifted serially to an output device at one end of the shift register by means of shift register clock signals. It is therefore imperative that the shift register clocks contain enough cycles to completely read out all charge packets. If the clocks have an insufficient number of cycles to completely read out all the charge packets, then some packets of information will remain in the shift register at the last location to which they were shifted. This remaining charge will subsequently be added to the charge from the next line of image information, thereby corrupting the spatial information of the image.

In some applications high speed and lower resolution may be preferred to a higher resolution approach. It may then be desirable to use the same sensor in both higher and lower resolution applications by using only a portion of the image area for the lower resolution applications. However, as mentioned above, all the pixel information within CCD devices must be shifted out of the devices. Therefore, in lower resolution applications, once the required pixels are read out of the device, the rest of the charge packets must still be clocked out and discarded. This increases the time required to process the information from an image and presents a problem in systems that must operate at high speeds and can not afford the added time.

Solid state image sensors, particularly charge coupled device (CCD) imagers, disclosed by prior art are similar to the type illustrated in FIG. 1a and 1b. The imager is comprised of an array of photosites, a transfer region, one or more CCD shift registers, and an output amplifier. This type of imager operates by absorbing incident light photons and generating electrons at the photo site at a rate equivalent to the local light intensity. These electrons are then transferred through the transfer region into the shift register in a parallel manner. The shift register is then clocked to transport the individual charge packets, in a serial manner, to the output section. It is therefore evident for the single shift register case of FIG. 1a that the register must be clocked more than 'm' times, or charge packets will be left behind in the register. Similarly, for the dual register case of FIG. 1b, M/2 cycles must be completed to read out all of the signal charge. This type of architecture therefore forces the user to allow enough time to completely read out the entire register.

FIG. 2 is an illustration of a prior art device having adjustable resolution features. In this architecture, the antiblooming features of the device are used to implement a variable resolution scheme. The antiblooming drain is located adjacent to the photodetectors and is used to drain charges from the CCD cells not used in creating an image. The charges from these unwanted cells are routed through to the antiblooming drain according to the selection features implemented by the user. The features of this prior art device are such that horizontal registers contain an isolation gate to achieve the variable levels of resolution. When the isolation gate is biased such that the channel potential is lower than the adjacent gate in the register, the charge packets to the right of the isolation gate will be read out via amplifiers, but the packets to the left of the isolation gate will be drained back through the antiblooming structure of the device, labeled Vsink. This architecture has the drawbacks that it is complex to build and requires many precise clock signals to control all the associated gates. The device of FIG. 2 requires a control signal that can be switched between a D.C. level, and the horizontal clock. The D.C. signal is required for the lower resolution mode and a horizontal clock signal is required for higher resolution mode. Furthermore, the device of FIG. 2 requires dual transfer electrodes, an antiblooming gate and a drain for each pixel. This increases the cell size, complexity and reduces the device yield.

It should be evident from the foregoing discussion that there remains a need within the prior art for variable resolution devices that do not leave extraneous charges within the device and that will provide higher speeds at lower resolution than is currently available with existing prior art devices. The present invention addresses the shortcomings of the prior art in providing such a device.

SUMMARY OF THE INVENTION

The present invention describes a solid state image sensor architecture that simplifies the implementation of resolution selection over the approaches previously mentioned within the prior art. This invention utilizes charge drain structures on the shift register, at logical locations set by the design, that allow the user to select which charge packets are needed and drain the remaining packets. Therefore, the clocks can be stopped after the needed number of cycles without leaving charge packets in the shift register, thereby prohibiting the subsequent image information from being corrupted. This decreases the time required to process the current information, and allows the system to operate at higher speeds.

The above is accomplished by an image sensing device comprising:

an array of photosites capable of generating electron hole pairs from incident light;

transfer means coupled to the photosites for allowing electrons to move from the photosites to a predetermined area;

at least one charge coupled device having a plurality of cells configured to function as a shift register to transport charge packets;

an output amplifier electrically coupled to one of the charge coupled devices;

at least one drain structure adjacent to the charge coupled device and operatively coupled to the charge coupled device to drain charge packets from a predetermined set of cells; and control means for initiating and disengaging operative coupling of the drain structure to the charge coupled device.

It is an object of the invention to provide an image sensing device that has selectable resolution.

It is further an object of the invention to provide a selectable image sensor in which the entire image sensing area can be used.

The above and other objects of the present invention will become more apparent when taken in conjunction with the following description and drawings wherein like characters indicate like parts and which drawings form a part of the present invention.

ADVANTAGEOUS EFFECT OF INVENTION

The present invention has advantages over prior art devices in that it provides a sensor that can operate at variable resolution, while operating at higher speeds for lower resolution purposes, and does not leave extraneous charges within shift registers during low resolution mode. The advantages of the present invention can be provided with a process adding little or no additional cost to the manufacturing of the device, while functioning in a simple "off" or "on" mode depending upon a logic level provided to the selection input.

BRIEF DESCRIPTION OF THE DRAWINGS

FIG. 1a is a schematic diagram of a conventional solid state image sensor with a CCD shift register FIG. 1b is a schematic diagram of a conventional solid state image sensor with two CCD shift registers

FIG. 3a is a schematic diagram of a solid state image sensor of the present invention with charge drain structures to adjust the resolution.

FIG. 3b is a schematic diagram of the image sensor of FIG. 3a operating in the high resolution mode.

FIG. 3c is a schematic diagram of the image sensor of FIG. 3a operating in the low resolution mode.

FIG. 4 is a cross sectional view of the device as seen in FIG. 3a along the line AA.

FIG. 5a is a potential diagram, as seen through the section AA of FIG. 3a for the low resolution mode.

DETAILED DESCRIPTION OF THE INVENTION

Figure 2:
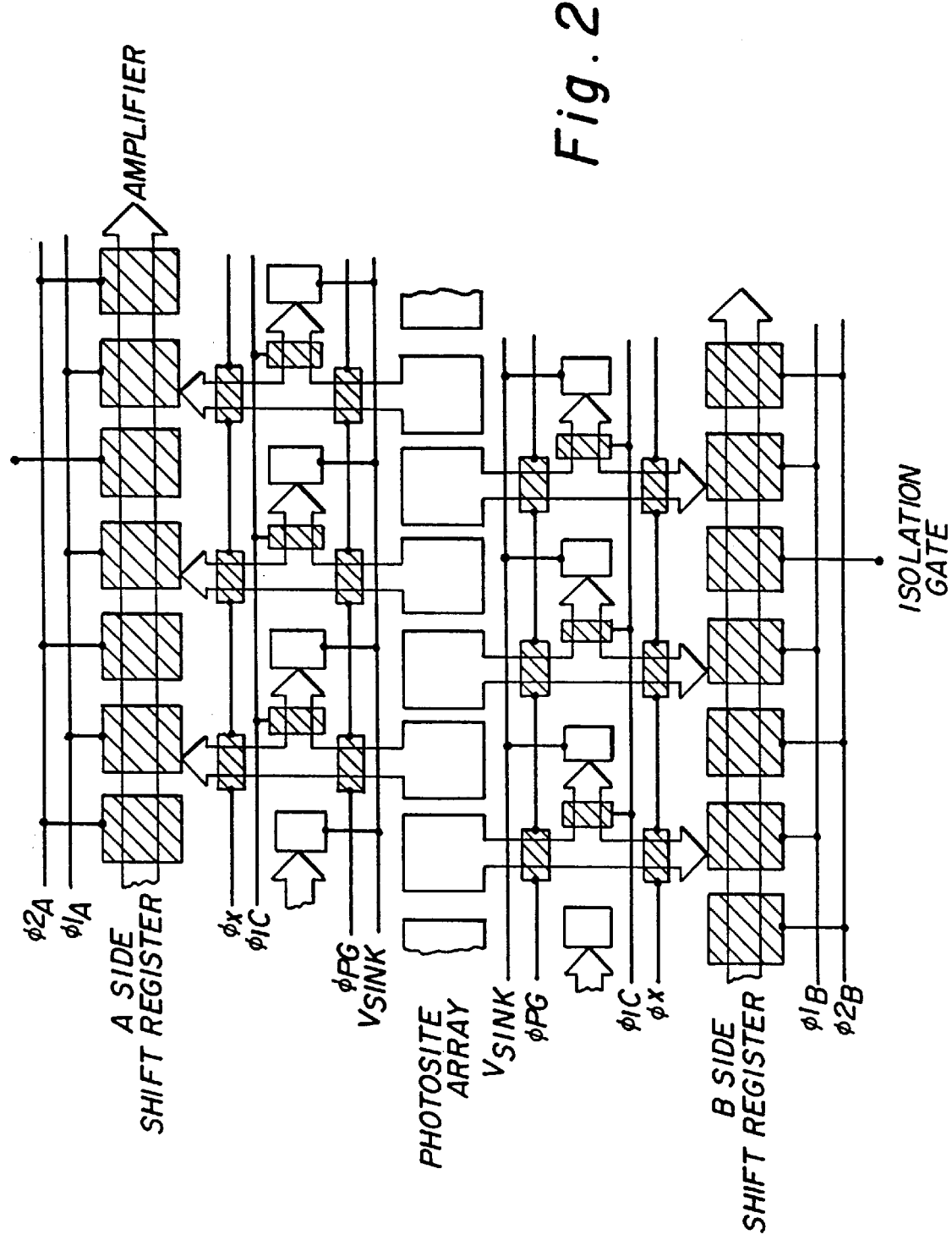
FIG. 2 is a schematic diagram of a prior art solid state image sensor having variable resolution.

Referring to FIG. 3a, it has been discovered that variable resolution image sensors, generally referred to as 10, can be made from an array of photosites 12, a transfer region 14, one or more CCD shift registers 16, and an output amplifier 28, and by proper positioning of drain structures adjacent the CCD. The imager of FIG. 3a operates generally in a conventional manner, similar to the device of FIG. 1a, by absorbing incident light photons and generating electrons at the photo site at a rate proportional to the incident light intensity. These electrons are then transferred through the transfer region 14 into the shift register 16 in a parallel manner. The shift register 16 is then clocked to transport the individual charge packets, in a serial manner, to the output section.

The architecture of the present invention, additionally, contains charge drain structures 22 at one or more locations on the shift register which allows the user to select which charge packets to maintain and which to drain. This feature allows the user to adjust the resolution of the image sensor to obtain only the information that is necessary for a given resolution. Furthermore, by positioning drains 22 to remove charges representative of pixels at various points, the present invention allow different resolutions. Unused cells are drained in the lower resolution modes, resulting in their not having to be clocked out of the CCD shift register 16. The architecture of the present invention increases the overall throughput of the image sensor in lower resolution modes. By not forcing the clocking for those pixels that are not going to be used, the required cycle time of the entire device is reduced in low resolution modes as compared to prior art devices requiring that the unused pixels be clocked out. The imager of the present invention operates in a manner similar to conventional devices with the exception that prior to commencing the operation, the user must select the desired resolution. The selected resolution will determine which charge packets are to be drained and those charge packets that are going to be used within the final output signal. The user applies the necessary electrical signals to the device thereby indicating which charge packets are required for the given resolution. The necessary DC signal is applied to the control electrodes 20 and 21 to create respective channel potentials that are higher than the channel potential in the shift register.

Referring now to FIG. 4, which is a cross section of FIG. 3a as seen through the line AA, the preferred mechanism envisioned by the present invention is illustrated. To operate in full resolution mode, the user must apply a DC signal to the control electrode 20 so that the channel potential below electrode 20 is lower than the channel potential in the shift register so no charge packets will be expelled trough the drain. Conversely, in order to operate the device 10 in a reduced resolution mode, the DC signal applied to the control electrode 20 must be such that the channel potential below the control electrode 20 is greater than that of the shift register. Thus allowing charge to be drained off.

Referring to FIGS. 3a, the operation of the variable resolution selection of the device performs as follows. Photo sites detect the incident light that is representative of the image data. The incident photons create electron-hole pairs of which the electrons are collected and subsequently transferred as charge packets into the shift register 16, and clocking begins. In accordance with the selected resolution of the device, control electrode 20 (or 21 in a different resolution that is not illustrated here) will allow those charge packets being shifted into the CCD phase 25 to be drained if electrode 20 is activated, or not to be drained if the control electrode is not activated.

Referring to FIG. 5a where the potential applied to electrode 20 creates the potential profile seen below electrode 20. Now referring to FIG. 3c, as long as electrode 20 is activated to allow the charge within the CCD phase 25 of shift register 16 to be drained off by activated drain 22, all charge packets to the left of the control electrode 20, as seen on FIG. 3c, will follow path 53 and flow into drain 22 because of the potential profile seen in FIG. 5a. All the charge packets to the right of control electrode 20, are clocked in the normal manner, along path 52 and will be sensed by the output amplifier 28. This feature allows the user to stop the clocking when the needed information is obtained and no charge packets are left behind in the shift register. Therefore, no additional clocking is required to clear charge packets from the shift register and the number of cycles required to clock out the desired data is minimized.

Figure 5B:
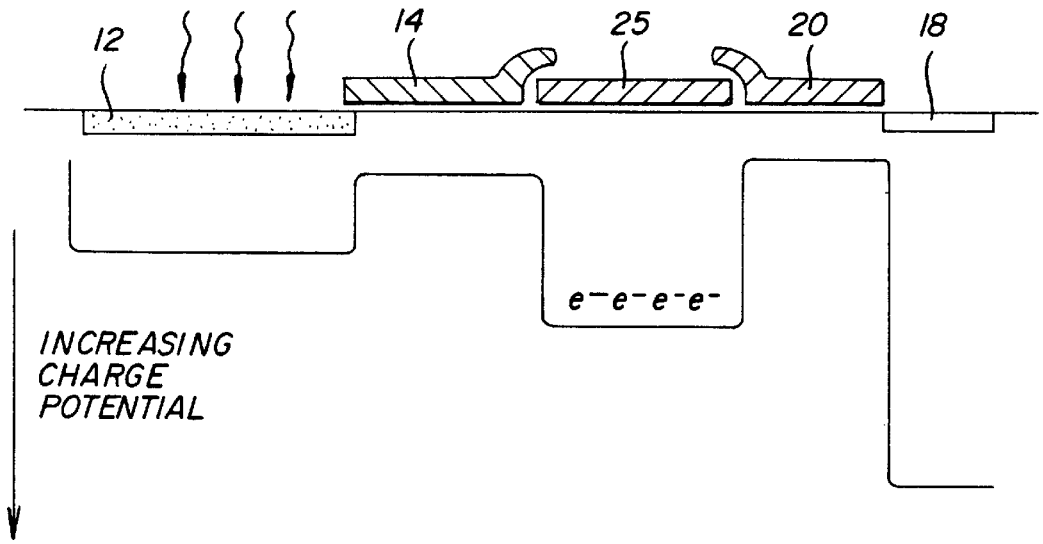
FIG. 5b is a potential diagram, as seen through the section AA of FIG. 3a for the high resolution mode.

Referring to FIG. 5b, if control electrode 20 is not activated, the potential profile beneath electrode 20 creates a barrier for charge within the CCD phase 25 of shift register 16. Referring to FIG. 3b, all charge packets will then be shifted out of the device along path 51 without encountering an activated drain, and therefore, will be sensed by the output amplifier 28.

Figure 6A:
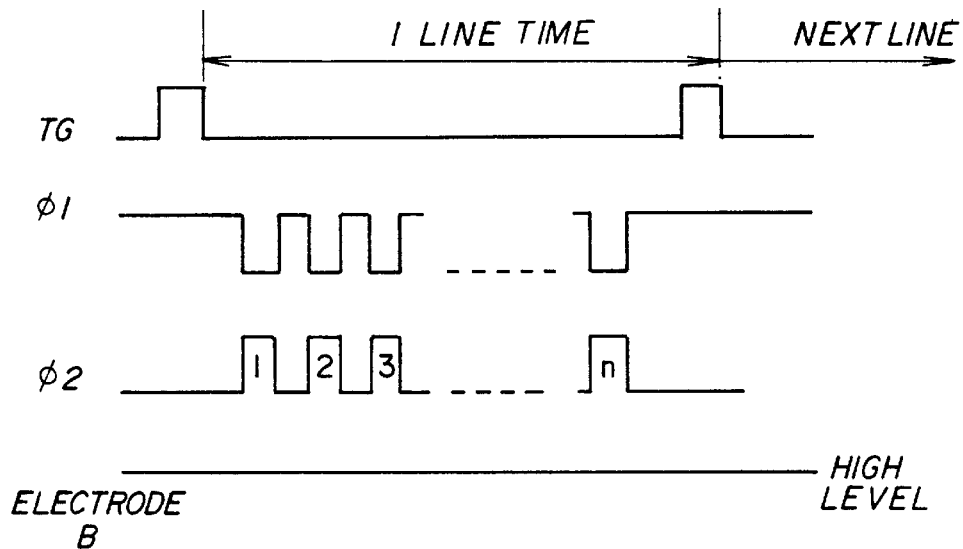
FIG. 6a is timing diagram for the low resolution mode.
Figure 6B:
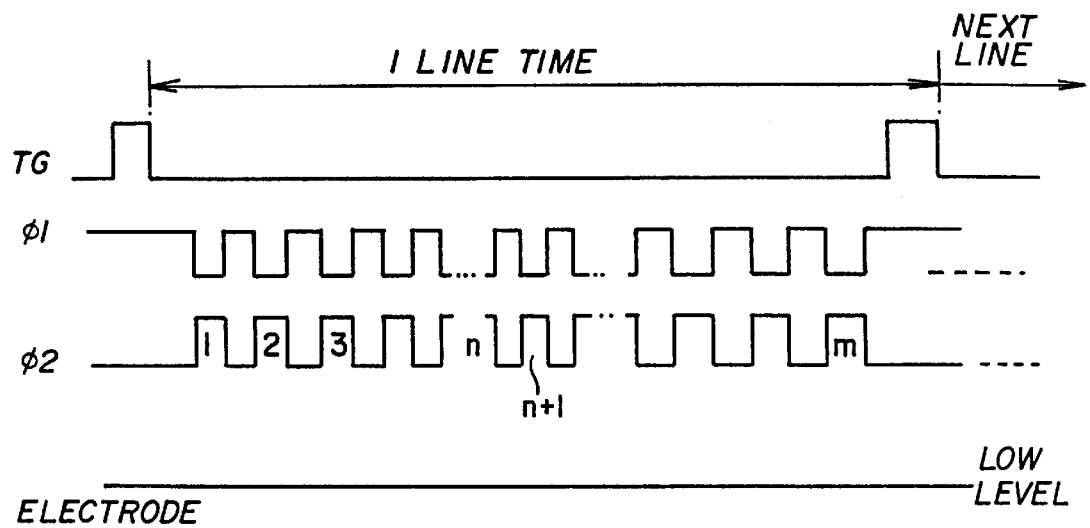
FIG. 6b is timing diagram for the high resolution mode.

Referring to FIG. 6a in conjunction with FIG. 3a, if user had selected a resolution that dictated that pixels 1 through 'n' were the required information cells, a high bias would be placed on control electrode 20. This would cause charge packets in cells 'n+1' through 'm' to be drained of charge as they are clocked into the CCD phase 25 adjacent to the control electrode 20 of the register. This operating mode, therefore, only requires 'n' clock cycles to read the needed information, instead of 'm' cycles as would be required by the prior art device. FIG. 6b is an illustration of the full resolution mode wherein none of the control electrodes have been activated and "m" cycles are required to clock out the data from CCD shift register 16.

Figure 7:
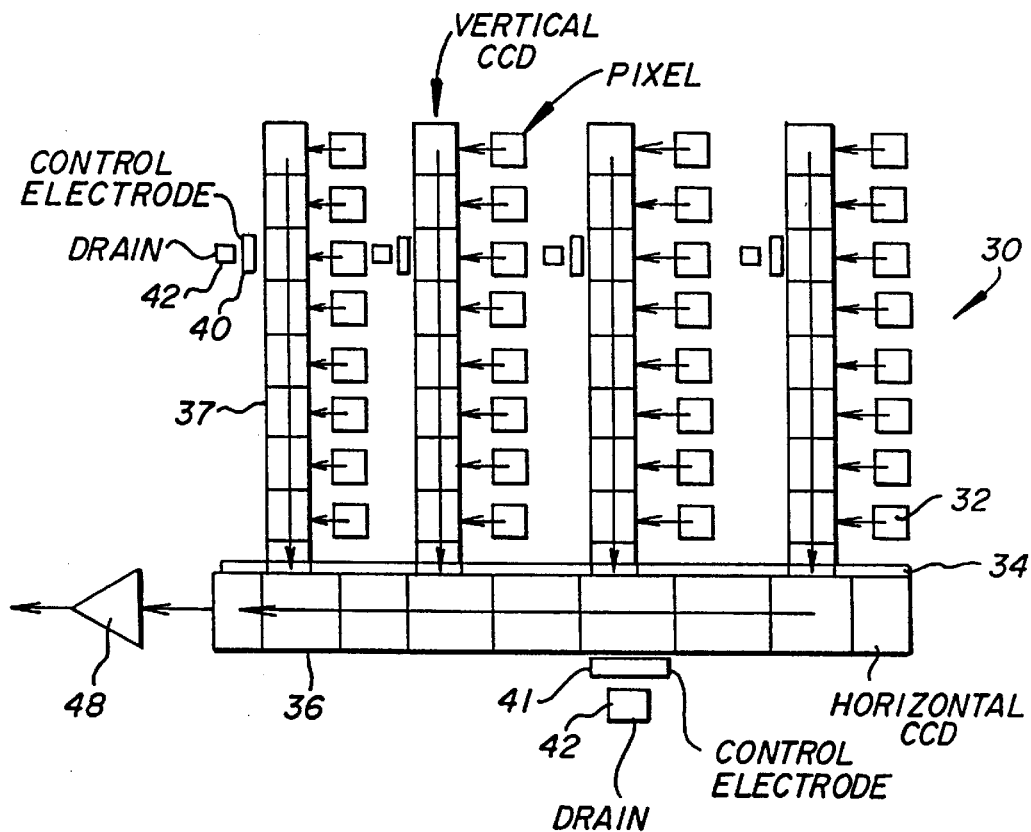
FIG. 7 is a schematic diagram of a two dimensional array implementing the multiple resolution scheme on a two dimensional scale.

Referring now to FIG. 7, which is an illustration of a two dimensional array 30 implementing the multiple resolution scheme of the present invention. Here, the vertical shift registers 37 each have drain structure 42 similar to those previously discussed in the case for linear image sensors. Additionally, the horizontal shift register 36 also can have variable resolution drain structures 42 to enable two dimensional variable resolution.

The features of the present invention produce a solid state image sensor with user selectable resolution that allows a faster system operating speed, overcoming the complexities of those described in the prior art. Moreover, the architecture of the device allows an operational system requiring fewer clocked input signals than those of the prior art.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

Parts List

2 Substrate
4 Epitaxial layer
6 Buried channel
10 CCD sensor
12 Photosites
14 Transfer region
16 Shift register
20 Control electrode
21 Control electrode
22 Drain
25 CCD phase electrode
28 Output amplifier
30 Two dimensional CCD sensor
32 Photosites
34 Transfer region
36 Horizontal shift register
37 Vertical shift register
40 Vertical control electrodes
41 Horizontal control electrode
42 Drain
48 Output amplifier
51 High resolution transport path
52 Low resolution transport path
53 Low resolution drain path

We claim:

1. An image sensing device comprising:

an array of photosites capable of generating electron hole pairs from incident light;

accumulation means for gathering electrons generated by the photosites and forming charge packets, therefrom;

transfer means coupled to the accumulation means for allowing charge packets to move from the accumulation means to a readout shift register;

at least one charge coupled shift register having a plurality of cells configured to function in a manner to serially readout charge packets;

an output amplifier operatively coupled to output charges from the charge coupled devices;

at least one drain structure operatively coupled to the shift register to drain charge packets from a predetermined set of cells, the drain being positioned adjacent to the shift register such that it divides the shift register into fractional portions; and control means for initiating and disengaging operative coupling of the drain structure to the shift register to select the predetermined set of cells to be drained of charge, thereby, providing selectable resolution of the image sensing device, the control means further comprising selection means operatively coupled to the charge coupled device for disabling serial readout of the predetermined set of cells to be drained of charge.

2. The invention of claim 1 wherein the drain structure further comprises a plurality of drain structures positioned adjacent to the charge coupled device, the drain structures dividing the shift register into a number of portions, such that multiple user selectable resolutions of the charge coupled device is obtained by the control means.

3. The invention of claim 2 wherein the drain structures provides for selectable resolution by allowing a first predetermined set of charge packets to be drained from the shift register and a second predetermined set of charge packets to be transferred out of the shift register to be read.

4. The invention of claim 1 wherein the device is a two dimensional array having in addition to the shift register, a horizontal shift register, and having an additional at least one drain structure along the horizontal shift register along one axis of the two dimensional array that is orthogonal to the axis containing the shift register.

5. The invention of claim 4 wherein the drain is a lateral overflow drain within the horizontal shift register.

6. The invention of claim 4 wherein the two dimensional array has at least one vertical shift register with the drain structure, along an axis orthogonal to the horizontal shift register.

7. The invention of claim 1 wherein the drain structure adjacent to the charge coupled device is an implanted drain region having a control gate.

8. The invention of claim 1 wherein the control means further is constructed from either polysilicon or metal.

9. The invention of claim 1 wherein the image sensing device is a two dimensional array that has at least one horizontal shift register and at least one vertical shift register along an axis orthogonal to the horizontal shift register, the vertical shift registers having the drain structure.

10. A method of making a variable resolution image sensing device comprising the steps of:

providing an image sensing device having an array of photosites capable of generating electron hole pairs from incident light, transfer means operatively coupled to the photosites for allowing electrons to move from the photosites to at least one charge coupled device configured to function as a shift register to transport charge packets, an output amplifier electrically coupled to the charge coupled device;

positioning on the image sensing device at least one drain structure adjacent to the charge coupled device such that the charge coupled device is partitioned into fractional parts and predetermined cells within the charge coupled device can be dissipated into the drain; and providing control means for selectively controlling the flow of charge from the charge coupled device into the drain structure such that different resolutions of the image sensing device can be selected, the control means further comprising selection means operatively coupled to the charge coupled device for disabling serial readout of the predetermined set of cells to be drained of charge.

11. The method of claim 10 wherein the step of positioning further comprises positioning at least one drain structure such that it provides for selectable resolution by allowing a first predetermined set of charge packets to be drained from the shift register and a second predetermined set of charge packets to be transferred out to the amplifier of the shift register as an output signal.

12. The method of claim 10 wherein the step of positioning further comprises positioning at least one drain structure such that the drain structure adjacent to the charge coupled device is an implanted drain region having a control gate.

* * * * *